(12) United States Patent
Xue et al.

(10) Patent No.: US 12,098,844 B2
(45) Date of Patent: Sep. 24, 2024

(54) INTEGRATED COMPREHENSIVE ADJUSTMENT METHOD FOR PULVERIZED COAL BOILER BASED ON PREVENTION AND CONTROL OF HIGH-TEMPERATURE CORROSION OF WATER WALL

(71) Applicant: SUZHOU TPRI ENER & ENVIRO TECH CO., LTD., Jiangsu (CN)

(72) Inventors: Xiaolei Xue, Jiangsu (CN); Min Chen, Jiangsu (CN); Xiaohua Wang, Jiangsu (CN); Baokang Chen, Jiangsu (CN); Shengjie Yu, Jiangsu (CN); Ruipeng Liu, Jiangsu (CN); Yue Li, Jiangsu (CN); Xiaomin Peng, Jiangsu (CN); Zhenfeng Mei, Jiangsu (CN); Peng Zhao, Jiangsu (CN); Yiwen Ding, Jiangsu (CN); Jinyong Zhu, Jiangsu (CN)

(73) Assignee: SUZHOU TPRI ENER & ENVIRO TECH CO., LTD., Jiangsu (CN)

( * ) Notice: Subject to any disclaimer, the term of this patent is extended or adjusted under 35 U.S.C. 154(b) by 0 days.

(21) Appl. No.: 18/027,218

(22) PCT Filed: Aug. 30, 2021

(86) PCT No.: PCT/CN2021/115258
§ 371 (c)(1),
(2) Date: Mar. 20, 2023

(87) PCT Pub. No.: WO2022/188375
PCT Pub. Date: Sep. 15, 2022

(65) Prior Publication Data
US 2023/0258328 A1     Aug. 17, 2023

(30) Foreign Application Priority Data
Mar. 12, 2021 (CN) .......................... 202110267372.0

(51) Int. Cl.
*F22B 37/38* (2006.01)
*F23M 5/08* (2006.01)
*G01M 99/00* (2011.01)
*F23D 1/00* (2006.01)

(52) U.S. Cl.
CPC ............... *F22B 37/38* (2013.01); *F23M 5/08* (2013.01); *G01M 99/002* (2013.01); *F23D 1/00* (2013.01)

(58) Field of Classification Search
CPC .......... F22B 37/38; F22B 37/10; F23M 5/08; G01M 99/002; F23J 15/02; F23C 7/00; F23N 1/00
USPC ................................ 110/343, 347, 186, 103
See application file for complete search history.

(56) References Cited

U.S. PATENT DOCUMENTS 5,809,913 A * 9/1998 Kramer ................... F23C 6/045
110/348
8,786,867 B2 * 7/2014 Matsumoto ........... F22B 37/005
250/559.22
9,429,319 B2 * 8/2016 Wakamatsu ............. F23C 9/08

FOREIGN PATENT DOCUMENTS

CN    101858591 A    10/2010
CN    201811207 U    4/2011
(Continued)

OTHER PUBLICATIONS

International Search Report for PCT/CN2021/115258 mailed on Nov. 29, 2021.
Written Opinion for PCT/CN2021/115258 mailed on Nov. 29, 2021.

*Primary Examiner* — Jessee R Roe
*Assistant Examiner* — Michael Aboagye
(74) *Attorney, Agent, or Firm* — Schmeiser, Olsen & Watts, LLP (57) ABSTRACT

An integrated comprehensive adjustment method for a pulverized coal boiler based on high-temperature corrosion prevention and control of water wall is provided. The
(Continued)

method includes: during shutdown period of the boiler, mounting reducing atmosphere sampling pipe on a water-cooled wall region; carrying out a diagnostic test on the boiler; carrying out an optimization and adjustment test of a boiler pulverizing system; carrying out a single-factor adjustment test of boiler-related parameters; determining degrees of influence of different parameters on water wall reducing atmosphere, thermal efficiency of the boiler and $NO_x$ concentration at a denitration inlet; carrying out an optimization test of ammonia spraying of a denitration system; carrying out a maximum safe denitration efficiency test; and finding a balance point among the water wall reducing atmosphere, the thermal efficiency of the boiler and the $NO_x$ concentration at the denitration inlet.

8 Claims, 6 Drawing Sheets

(56) References Cited

FOREIGN PATENT DOCUMENTS

| | | | | |
|---|---|---|---|---|
| CN | 105675810 A | | 6/2016 | |
| CN | 105953259 A | | 9/2016 | |
| CN | 106678783 | * | 5/2017 | ............. F22B 37/38 |
| CN | 106950168 A | | 7/2017 | |
| CN | 107044628 A | | 8/2017 | |
| CN | 109631009 A | | 4/2019 | |
| CN | 111426649 | * | 7/2020 | ............. F22B 37/38 |
| CN | 112945600 A | | 6/2021 | |
| KR | 20180023251 A | | 3/2018 | |

* cited by examiner

Test of changing air distribution mode at 300 MW load

Fig. 3b

Test of changing air distribution mode at 550 MW load

Fig. 4a

Test of changing operation oxygen content at 300 MW load

Fig. 4b

Test of changing operation oxygen content at 550 MW load

Fig. 5a

Test of changing opening degree of the perimeter air at 490 MW load

Fig. 5b

Test of changing opening degree of the perimeter air at 300 MW load

INTEGRATED COMPREHENSIVE ADJUSTMENT METHOD FOR PULVERIZED COAL BOILER BASED ON PREVENTION AND CONTROL OF HIGH-TEMPERATURE CORROSION OF WATER WALL

CROSS-REFERENCE TO RELATED APPLICATIONS

This application claims priority to PCT Application No. PCT/CN2021/115258, having a filing date of Aug. 30, 2021, which claims priority to CN Application No. 202110267372.0, having a filing date of Mar. 12, 2021, the entire contents both of which are hereby incorporated by reference.

FIELD OF TECHNOLOGY

The following relates to a combustion optimization and adjustment method for a pulverized coal boiler, in particular to an integrated comprehensive adjustment method for a pulverized coal boiler based on the prevention and control of high-temperature corrosion of the water wall.

BACKGROUND

High-temperature corrosion is a complex physical and chemical process in which the high temperature flue gas in the boiler interacts with the metal wall, and according to its mechanism, it can usually be divided into three categories: sulfate type high-temperature corrosion, sulfide type high-temperature corrosion and chloride type high-temperature corrosion; there are usually two types of high-temperature corrosion of domestic coal-fired boilers, namely sulfate type high-temperature corrosion and sulfide type high-temperature corrosion. The high-temperature corrosion on the water wall of coal-fired boilers is usually sulfide type high-temperature corrosion, which is mainly caused by $H_2S$ gas in the flue gas.

Due to the increasingly stringent environmental protection requirements, in order to control the emission of pollutants such as NON, coal-fired boilers generally adopt the low-nitrogen combustion technology of deep air classification, and there is oxygen-deficient combustion in the main combustion area of the boiler, so that a reducing atmosphere presents near the water wall of the boiler as a whole, the concentration of corrosive gases such as $H_2S$ increases, and the high-temperature corrosion of the boiler water wall becomes increasingly serious. At the same time, due to factors such as the difficulty of detecting $H_2S$ gas and the fact that high-temperature corrosion can only be found when the boiler is shut down for inspection, the problem of high-temperature corrosion of the boiler water wall is easily ignored during daily operation. In recent years, with the long-term operation of low-nitrogen combustion boilers and the implementation of stricter ultra-clean emission standards, the problem of high-temperature corrosion of boiler water walls has become increasingly prominent, and large-scale high-temperature corrosion and even pipe explosion of water walls have occurred from time to time, especially for boilers burning high-sulfur coal, the problem of high-temperature corrosion of the water wall is more prominent. The high-temperature corrosion of boiler water wall has become one of the main problems affecting the safe production of power plants.

At present, the measures to solve the problem of high temperature corrosion of boiler water wall mainly comprise combustion adjustment, use of low-sulfur coal for combustion, water wall spraying, anti-corrosion modification of wall wind, optimization of burner layout, etc., where, the boiler combustion adjustment is the first choice for many power plants when faced with high-temperature corrosion of water walls. However, the traditional combustion adjustment pays more attention to indicators such as the boiler steam temperature, the wall temperature, the content of combustible matter in fly ash, the exhaust gas temperature, the CO content, the boiler thermal efficiency and the $NO_x$ concentration, or is solely aimed at reducing the high-temperature corrosion of the water wall, it is impossible to realize the comprehensive optimization of the overall operation indicators of the boiler, that is, it is impossible to find the best balance between the safety, economic and environmental indicators such as the boiler water wall reducing atmosphere, the boiler thermal efficiency, the $NO_x$ concentration at the denitration inlet, and the steam temperature and wall temperature of the boiler.

SUMMARY

An aspect relates to an integrated comprehensive adjustment method for a pulverized coal boiler based on the prevention and control of high-temperature corrosion of the water wall, which can truly realize the comprehensive optimization of the overall operation indicators such as boiler water wall reducing atmosphere, the boiler thermal efficiency, and the $NO_x$ concentration at the denitration inlet.

To achieve the above purpose, a technical solution employed by the present disclosure is:

An integrated comprehensive adjustment method for a pulverized coal boiler based on the prevention and control of high-temperature corrosion of a water wall, comprises: mounting reducing atmosphere sampling pipes during a shutdown period to extract flue gas at the water wall of the boiler for testing; on this basis, obtaining key data such as water wall reducing atmosphere, $NO_x$ concentration at a denitration inlet, boiler thermal efficiency, steam temperature and wall temperature of the boiler, etc., through a comprehensive diagnostic test of the boiler and carrying out an adjustment test on the basis of this data; the present disclosure firstly carries out a basic optimization and adjustment test of the boiler pulverizing system, so as to carry out basic adjustment in terms of distribution of air powder and fineness of pulverized coal, so as to prevent the high-temperature corrosion of the water wall, the deviation of the steam temperature and the over temperature of the wall caused by the partial burning of the boiler; the present disclosure conducts the adjustment test of boiler-related adjustable parameters, and based on the test results, compares influence levels of the boiler-related parameters on the water wall reducing atmosphere, the boiler thermal efficiency, the $NO_x$ concentration at the denitration inlet, and the steam temperature and wall temperature of the boiler, to further determine priorities of the boiler-related parameters in the optimization process; after the optimization and adjustment of ammonia spraying, embodiments of the present invention determine a maximum value of $NO_x$ concentration at the denitration inlet that the denitration system can withstand under the condition that the ammonia escape does not exceed the standard, and then takes the maximum value of $NO_x$ concentration at the denitration inlet as a balance point of the $NO_x$ concentration at the denitration inlet, to determine a balance point between the boiler water wall reducing atmosphere and the boiler thermal efficiency, and according to the determined priority of the boiler-related parameters, determines an optimized operation mode of the boiler.

The present disclosure has the following beneficial effects:

Based on the integrated adjustment of pulverized coal-related parameters and boiler-related parameters, the present disclosure realizes the comprehensive optimization of the overall operation indicators such as boiler water wall reducing atmosphere, boiler thermal efficiency, and $NO_x$ concentration at the denitration inlet; this method can not only avoid the shortcomings of traditional combustion adjustment that only focuses on the indicators such as steam temperature, wall temperature, boiler thermal efficiency and $NO_x$ concentration at the denitration inlet, but ignores the problem of high-temperature corrosion of the water wall, but also avoid the shortcomings of the excessive consideration of the high-temperature corrosion of the water wall and neglecting the influence of boiler thermal efficiency and the $NO_x$ concentration index at the denitration inlet in the traditional combustion adjustment, especially the influence on the safe operation of the downstream equipment after the $NO_x$ concentration at the denitration inlet increases; the present disclosure obtains the best balance point between the safety, economy and environmental protection indicators such as the boiler water wall reducing atmosphere, the boiler thermal efficiency and the $NO_x$ concentration at the denitration inlet, and an optimized operation mode.

BRIEF DESCRIPTION

Some of the embodiments will be described in detail, with references to the following Figures, wherein like designations denote like members, wherein.

DETAILED DESCRIPTION

In the following, the technical solutions of the present disclosure are explained clearly and completely below in conjunction with the accompanying drawings, and apparently, the described embodiments are merely a part of the embodiments of the present disclosure, not all the embodiments. Based on the embodiments of the present disclosure, all other embodiments obtained by one of ordinary skill in the conventional art without creative work fall within the protective scope of the present disclosure.

This embodiment takes the HG-2141/25.4-YM16 boiler manufactured by Harbin Boiler Factory Co., Ltd. as an example, and this boiler is a once-through boiler with primary intermediate reheat, at supercritical pressure variable pressure operation and configured with a built-in recirculation pump start-up system, and it is a π-type boiler with single furnace, balanced ventilation, solid slag tapping, full steel frame, full suspension structure and tight-fitting closed arrangement. Designed coal for the boiler is bituminous coal from Hequ County, Xinzhou City, Shanxi Province. The boiler adopts a cold primary air fan positive pressure direct blowing pulverizer system with double-in double-out steel ball mill, equipped with 6 sets of MGS3854 double-inlet and double-outlet steel ball mills, when the designed coal is used, 6 sets of coal mills are running, and there is no backup. The designed pulverized coal fineness $R_{90}$ is 22.5%. The boiler adopts a novel tangential firing mode, the main burner is arranged on the four walls of the water wall, and each layer has 4 burners corresponding to a coal mill. SOFA burners are arranged at the four corners of the water wall above the main burner zone to achieve staged combustion to reduce $NO_x$ emissions. During the maintenance for the boiler, it was found that high-temperature corrosion occurred on the water wall pipes of the four walls of the boiler, the corrosion areas were mainly concentrated on the water wall pipes of the front wall and the rear wall, and the rear wall was the most serious. The high-temperature corrosion position of the water wall pipes is above the pulverized coal burners of the F layer of the main burners on the four walls of the boiler and below the high-level burnt-off air nozzles, and the total corrosion area is about 400 square meters.

Figure 1:
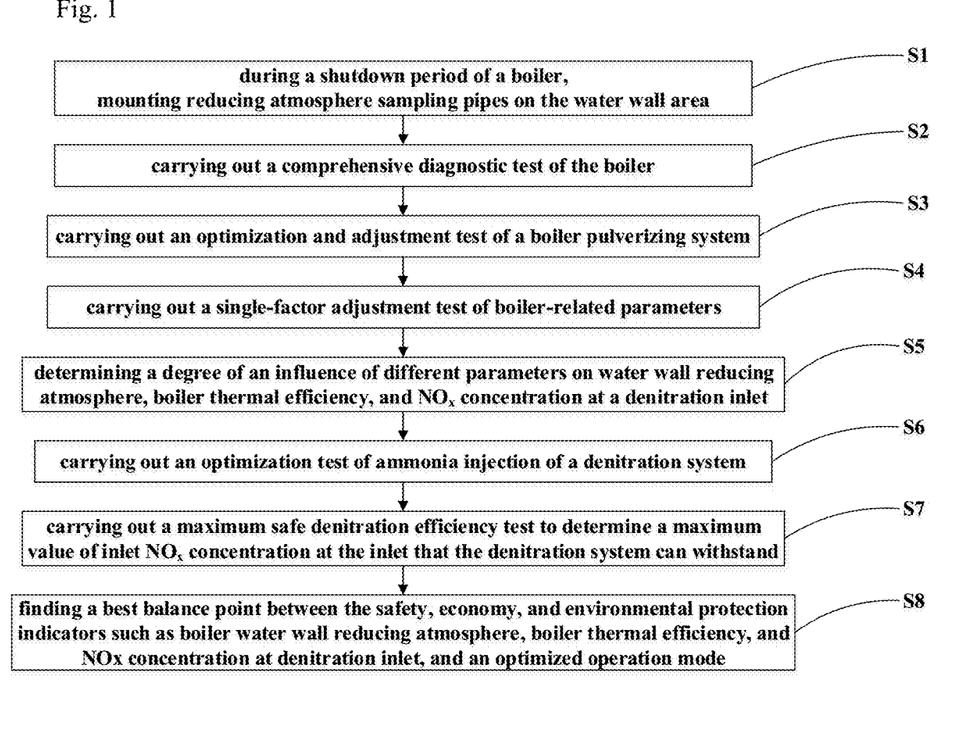
FIG. 1 is a schematic diagram of the overall flow of an embodiment.

Referring to FIG. 1, an integrated comprehensive adjustment method for a pulverized coal boiler based on the prevention and control of high-temperature corrosion of the water wall of this embodiment, comprises the following steps:

S1, During the shutdown period of the boiler, mounting reducing atmosphere sampling pipes on the water wall area of the boiler.

Specifically, in this step S1, inspection is carried out during the shutdown period, to determine the main area where high-temperature corrosion occurs on the water wall of the boiler; according to the furnace type and the area where high-temperature corrosion occurs, the installation distribution location and quantity of the reducing atmosphere sampling pipes are determined.

Figures 2A, 2B:
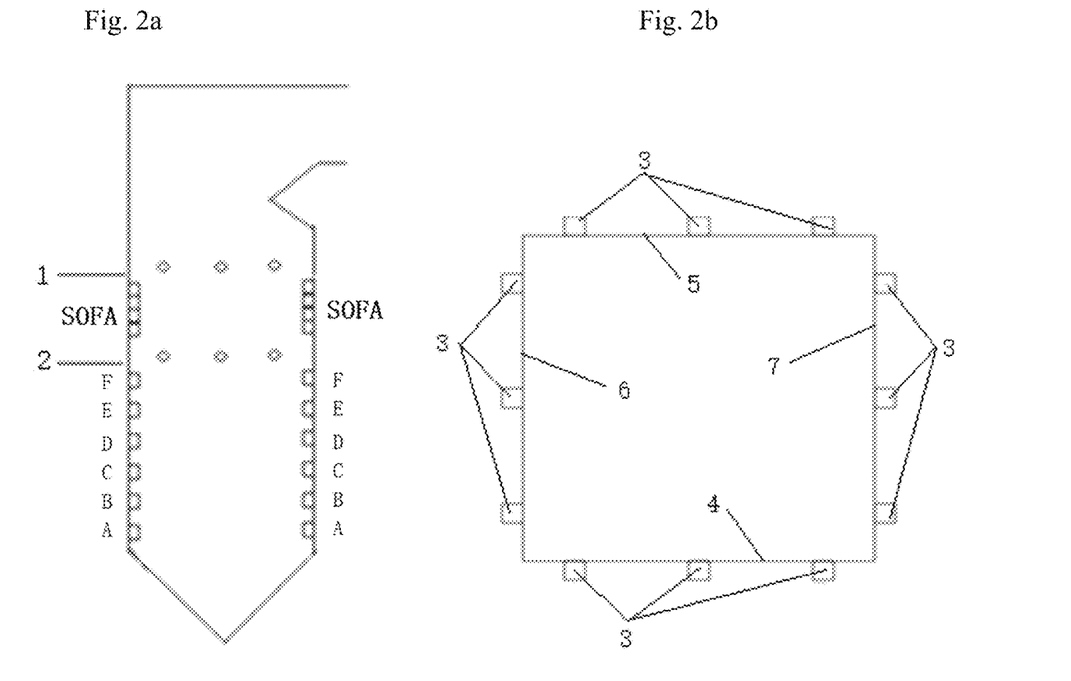
FIG. 2a is the layout diagram of measuring points of reducing atmosphere near the water wall in this embodiment.
FIG. 2b is the layout diagram of measuring points of reducing atmosphere near the water wall in this embodiment.

The boiler in this embodiment is a wall-type tangential-round boiler, and the high-temperature corrosion areas of the water wall are mainly concentrated on four walls above the pulverized coal burners of the F layer of the main burners on the four walls of the boiler and below the high-level burnt-off air nozzles. According to the furnace type, the area where the high-temperature corrosion of the water wall occurs, and the site conditions, the water wall reducing atmosphere sampling pipes are arranged in two layers in the height direction of the furnace, mainly distributed in the area between the burners of the F layer and SOFA air (a B-layer soot blower layer 2), the upper area of the SOFA air (a D-layer soot blower layer 1), each layer is provided with about 12 measuring points 3, and each side wall (the front wall 4, the rear wall 5, the left wall 6, and the right wall 7) is provided with 3 measuring points 3, a total of 24 measuring points in two layers. The arrangement of measuring points is shown in FIGS. 2a and 2b. The reducing atmosphere sampling pipes penetrate the furnace from the fins of the water wall and are flush with the inner wall of the water wall, and are stainless steel pipes with a diameter of about 10 mm.

S2. Carrying out a comprehensive diagnostic test of the boiler.

The test is carried out at three typical load points, namely high, medium and low load points, in this embodiment, the high load is a 570 MW load, the medium load is a 450 MW load, and the low load is a 300 MW load. During the test, the water wall reducing atmosphere, the $NO_x$ concentration at the denitration inlet, and the boiler thermal efficiency are mainly tested, and at the same time key data such as the boiler steam temperature and wall temperature in the DCS system are collected, so as to fully understand the facility operation status of the boiler, at the same time, the test parameter data obtained from the diagnostic test can be used as the basic data for the next adjustment test. The main results of the diagnostic test are shown in Table 1, and the results of the diagnostic test of the water wall reducing atmosphere are shown in Table 2.

TABLE 1

Summary of the results of the diagnostic test

| Operating condition numbering | | — | T-01 | T-02 | T-03 |
|---|---|---|---|---|---|
| Operating condition description | | — | 570 MW load diagnostic operating | 300 MW load diagnostic operating | 450 MW load diagnostic operating |
| Load | | MW | 570.0 | 300.0 | 450.0 |
| Mill operation mode | | — | ABCDEF | BCEF | ABCDEF |
| Operation oxygen content on dashboard | | % | 2.60 | 4.70 | 3.60 |
| Total amount of feeding coal | | t/h | 279 | 150 | 232 |
| Ambient temperature | | °C. | 3 | −2 | 2 |
| $NO_x$ concentration at the denitration inlet on dashboard | | mg/m³ | 272 | 281 | 288 |
| Opening degree of air door | UD | % | 70 | 65 | 100 |
| | UC | % | 10 | 0 | 30 |
| | UB | % | 70 | 40 | 80 |
| | UA | % | 70 | 40 | 80 |
| | FF | % | 45 | 40 | 45 |
| | F | % | 45 | 40 | 45 |
| | EF | % | 45 | 40 | 45 |
| | E | % | 45 | 40 | 45 |
| | DE | % | 45 | 40 | 45 |
| | D | % | 45 | 30 | 45 |
| | DD | % | 45 | 40 | 50 |
| | CC | % | 45 | 40 | 50 |
| | C | % | 60 | 40 | 50 |
| | BC | % | 60 | 40 | 50 |
| | B | % | 60 | 45 | 60 |
| | AB | % | 65 | 40 | 60 |
| | A | % | 65 | 20 | 60 |
| | AA | % | 65 | 20 | 60 |
| Air fan current | Primary air fan current | A | 181.0 | 140.0 | 164.0 |
| | Forced draft fan current | A | 93.0 | 71.0 | 79.0 |
| | Induced draft fan current | A | 441.0 | 286.0 | 360.0 |
| | Total fan current | A | 715.0 | 497.0 | 603.0 |
| Measured data | Combustible matter in fly ash | % | 0.97 | 0.39 | 0.66 |
| | Combustible matter in boiler slag | % | 0.51 | 0.50 | 0.64 |
| | Operation oxygen content | % | 2.87 | 4.99 | 3.68 |
| | $NO_x$ (6% $O_2$) | mg/m³ | 288 | 295 | 303 |
| | CO content | μL/L | 5 | 3 | 3 |
| Boiler thermal efficiency | Measured boiler thermal efficiency | % | 93.08 | 92.65 | 93.17 |
| | Corrected exhaust gas temperature | °C. | 144.2 | 135.1 | 139.7 |
| | Corrected heat loss due to exhaust gas | % | 5.91 | 6.23 | 5.95 |
| | Heat loss due to unburned carbon | % | 0.50 | 0.21 | 0.33 |
| | Corrected boiler efficiency | % | 93.09 | 92.90 | 93.16 |
| Wall temperature and Steam temperature | Flue gas temperature deviation between two sides of furnace outlet | SH finishing inlet | °C. | 55 | 20 | 35 |
| | | RH finishing inlet | °C. | 7 | 64 | 28 |
| | | RH finishing outlet | °C. | 66 | 24 | 57 |
| | Maximum wall temperature of RH finishing header | °C. | 596.2 | 583.6 | 594.9 |
| | Maximum wall temperature of SH finishing header | °C. | 604.1 | 605.4 | 604.3 |
| | Maximum wall temperature of division panel header | °C. | 531.6 | 533.7 | 527.5 |
| | Maximum wall temperature of vertical water wall | °C. | 415.6 | 391.2 | 400.1 |
| | Main steam temperature | °C. | 571.2/567.8 | 571.1/568.2 | 571.3/567.8 |
| | Reheat steam temperature | °C. | 565.3/564.4 | 565.4/567.0 | 564.7/565.6 |

TABLE 1-continued

Summary of the results of the diagnostic test

| Operating condition numbering | — | T-01 | T-02 | T-03 |
|---|---|---|---|---|
| Main steam temperature deviation on opposite sides | °C. | 3.4 | 2.9 | 3.5 |
| Reheat steam temperature deviation on opposite sides | °C. | 0.9 | 1.6 | 0.9 |

TABLE 2

Test results of the water wall reducing atmosphere under different loads

570 MW of diagnostic operating conditions, the operation oxygen content is 2.6%, the $NO_x$ concentration is 285 mg/m$^3$, the sulfur content in coal is 0.73%

| Test conditions | | | Front wall | | | Right wall | | | Rear wall | | | Left wall | | | |
|---|---|---|---|---|---|---|---|---|---|---|---|---|---|---|---|
| Measuring point positions | Items | Units | Near left wall | Middle | Near right wall | Near front wall | Middle | Near rear wall | Near right wall | Middle | Near left wall | Near rear wall | Middle | Near front wall | Mean |
| D-layer soot blower | $O_2$ | % | 0.6 | / | 1.2 | / | 0.7 | 0.8 | 0.6 | / | / | / | / | 1.7 | 0.9 |
| | CO | μL/L | 30000 | / | 10600 | / | 11800 | 10800 | 16600 | / | / | / | / | 4151 | 13992 |
| | $H_2S$ | μL/L | 331 | / | 296 | / | 289 | 328 | 291 | / | / | / | / | 221 | 293 |
| B-layer soot blower | $O_2$ | % | / | 0.0 | 0.0 | 0.0 | 0.9 | 0.0 | 2.4 | 0.5 | / | 0.0 | 0.0 | 0.4 | 0.4 |
| | CO | μL/L | / | 61800 | 102400 | 46700 | 68000 | 53200 | 64500 | 10050 | / | 80800 | 10170 | 11000 | 69060 |
| | $H_2S$ | μL/L | / | 343 | 393 | 350 | 359 | 332 | 351 | 415 | / | 384 | 409 | 306 | 364 |

450 MW of basic operating conditions, the operation oxygen content is 3.8%, the $NO_x$ concentration is 300 mg/m$^3$, the sulfur content in coal is 0.76%

| Test conditions | | | Front wall | | | Right wall | | | Rear wall | | | Left wall | | | |
|---|---|---|---|---|---|---|---|---|---|---|---|---|---|---|---|
| Measuring point positions | Items | Units | Near left wall | Middle | Near right wall | Near front wall | Middle | Near rear wall | Near right wall | Middle | Near left wall | Near rear wall | Middle | Near front wall | Mean |
| D-layer soot blower | $O_2$ | % | 1.8 | / | 1.9 | / | 2.4 | 2.6 | 1.8 | / | / | / | / | 3.3 | 2.30 |
| | CO | μL/L | 6275 | / | 4383 | / | 1304 | 980 | 3555 | / | / | / | / | 356 | 2809 |
| | $H_2S$ | μL/L | 228 | / | 265 | / | 236 | 245 | 280 | / | / | / | / | 201 | 243 |
| B-layer soot blower | $O_2$ | % | / | 1.2 | 0.1 | 0.0 | 0.0 | 0.0 | / | 0.2 | / | 0.9 | 0.1 | 1.9 | 0.5 |
| | CO | μL/L | / | 17900 | 46500 | 64600 | 10260 | 91000 | / | 84200 | / | 10400 | 76500 | 6937 | 55626 |
| | $H_2S$ | μL/L | / | 326 | 355 | 384 | 406 | 399 | / | 412 | / | 351 | 394 | 299 | 370 |

300 MW of diagnostic operating conditions, the operation oxygen content is 4.8%, the $NO_x$ concentration is 282 mg/m$^3$, the sulfur content of coal is 0.75%

| Test conditions | | | Front wall | | | Right wall | | | Rear wall | | | Left wall | | | |
|---|---|---|---|---|---|---|---|---|---|---|---|---|---|---|---|
| Measuring point positions | Items | Units | Near left wall | Middle | Near right wall | Near front wall | Middle | Near rear wall | Near right wall | Middle | Near left wall | Near rear wall | Middle | Near front wall | Mean |
| D-layer soot blower | $O_2$ | % | 1.5 | / | 4.5 | / | 2.7 | 3.4 | 3.6 | / | / | / | / | 2.3 | 3.00 |
| | CO | μL/L | 1870 | / | 2455 | / | 4949 | 1710 | 6762 | / | / | / | / | 7613 | 7032 |
| | $H_2S$ | μL/L | 176 | / | 283 | / | 433 | 367 | 335 | / | / | / | / | 220 | 302 |
| B-layer soot blower | $O_2$ | % | / | 2.2 | 0.9 | 3.8 | 1.2 | 1.7 | / | 0.8 | / | 3.3 | 0.4 | / | 1.8 |
| | CO | μL/L | / | 6675 | 1690 | 3699 | 1320 | 12700 | / | 4250 | / | 1720 | 7640 | / | 23659 |
| | $H_2S$ | μL/L | / | 402 | 415 | 537 | 480 | 403 | / | 316 | / | 380 | 535 | / | 434 |

Note:
"/" means that there is air leakage in this measuring point, and the reducing atmosphere cannot be measured. It needs to eliminate the defect after the boiler is shut down.

S3, carrying out an optimization and adjustment test of the boiler pulverizing system.

In this test, the air-powder leveling test of the pulverized coal pipe of the coal mill is first carried out; whether the primary air-powder of each pulverized coal pipe at the outlet of the coal mill is uniform directly affects the combustion condition in the furnace. When the difference between the primary air-powder in the pulverized coal pipe is too large, it will cause problems such as combustion deflection, over-temperature of the local water wall pipe wall, and clogging of the pulverized coal pipe. By adjusting the adjustable shrinkage hole of the coal mill and the pulverized coal distributor, the air velocity deviation between the pulverized coal pipes of the coal mill is controlled within 5%, and the deviation of the pulverized coal amounts between two pulverized coal pipes on the same side of the coal mill is also controlled within 5%, to achieve uniform air-powder distribution.

Figure 4A:
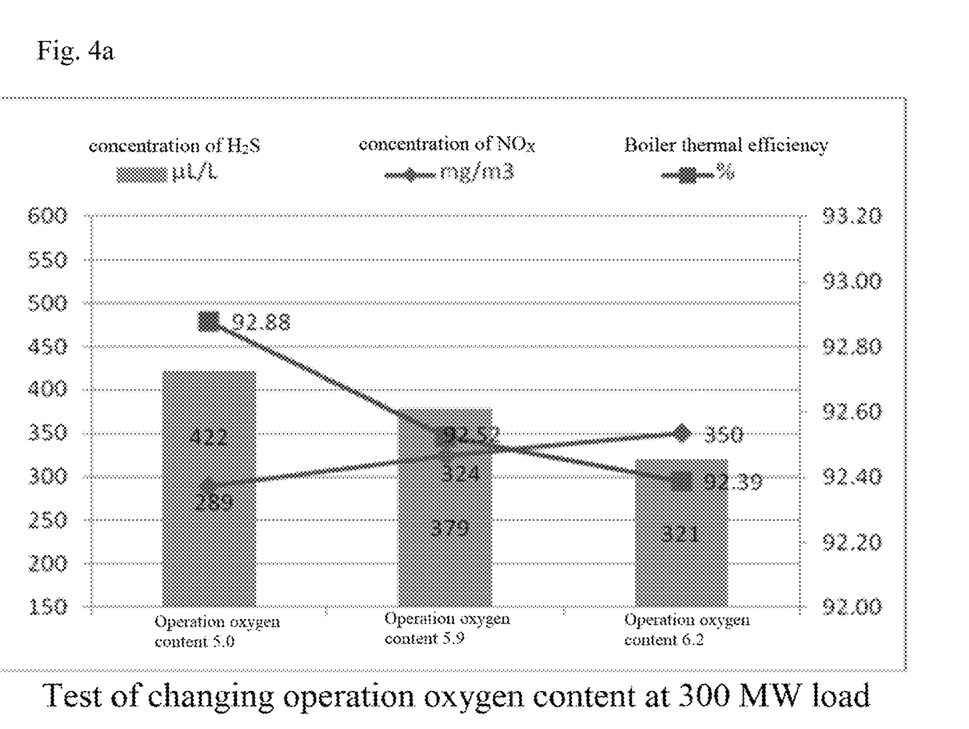
FIG. 4a is the experimental result of adjusting the operation oxygen content in this embodiment.
Figure 4B:
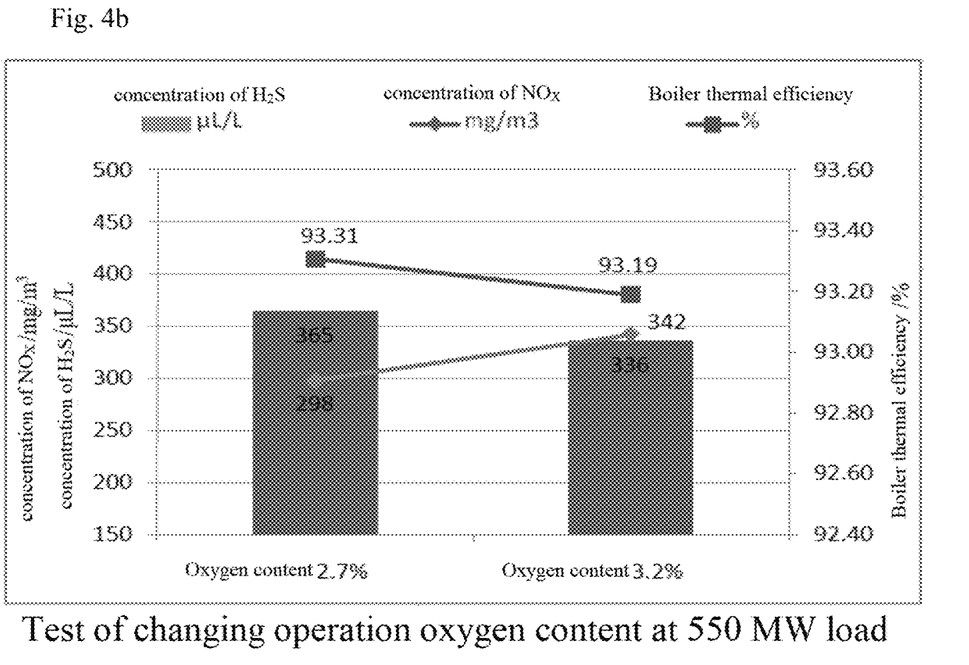
FIG. 4b is the experimental result of adjusting the operation oxygen content in this embodiment.

Secondly, the fineness adjustment test of the pulverized coal of the coal mill is carried out. In the conventional blended coal combustion mode of the boiler, the weighted volatile $V_{daf}$ of the burning blended coal is about 40%~43%, and the reasonable pulverized coal fineness $R_{90}$ should be about 20.0%~25.5%. Through the diagnostic test of the pulverized coal fineness of each coal mill, it can be seen that the pulverized coal fineness $R_{90}$ of the coal mills A, C, D, and F is about 17.0%~20.0%, and the pulverized coal fineness $R_{90}$ of the coal mill B and E s is about 14.0%~17.0%. In order to increase the coal mill output, the pulverized coal fineness of the coal mill is properly adjusted by a damper of a folding door, and after the adjustment, the output of a single coal mill is increased by about 2 t/h~3 t/h, and the pulverized coal fineness $R_{90}$ of all coal mill is in the range of 20% to 25.5%, and the adjustment results are shown in Table 3.

air decreases, the boiler thermal efficiency does not change much, but the $NO_x$ concentration at the denitration inlet increases;

2) Adjustment Test of the Operation Oxygen Content:

Under the condition that other operating parameters are the same for 550 MW and 300 MW loads, the operation oxygen content adjustment test was carried out, and the test results of the water wall reducing atmosphere in the area between the burners and the burnt-off air, the $NO_x$ concentration (6% $O_2$) at the denitration inlet and the boiler thermal efficiency under different operation oxygen contents are shown in FIGS. 4a and 4b. It can be seen from the test results that as the proportion of operation oxygen content increases, the $H_2S$ content of the water wall in the area between the burners and the burnt-off air decreases, but the boiler thermal efficiency decreases, and the $NO_x$ concentration at the denitration inlet increases.

Figure 5A:
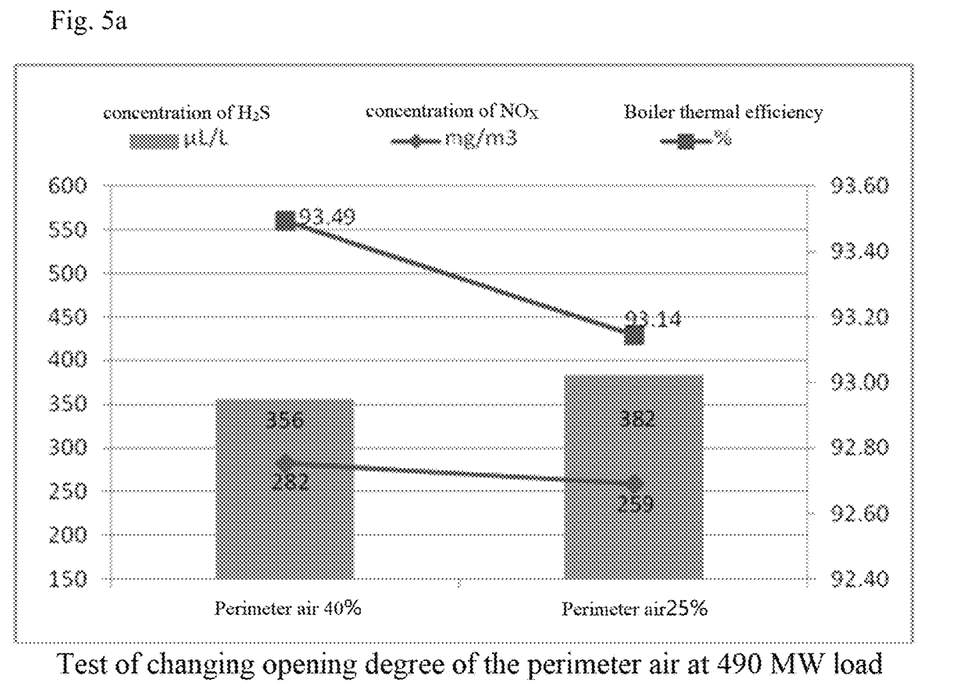
FIG. 5a is the experimental result of adjusting the opening degree of the perimeter air in this embodiment.
Figure 5B:
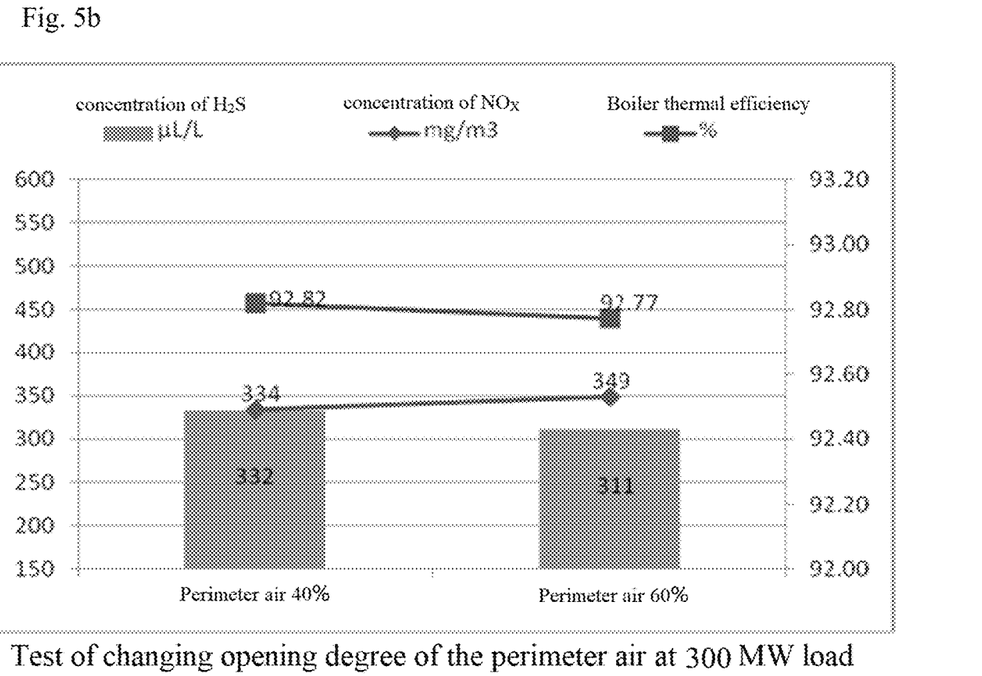
FIG. 5b is the experimental result of adjusting the opening degree of the perimeter air in this embodiment.

3) Adjustment Test of the Opening Degree of the Perimeter Air:

Under the operation conditions of 490 MW and 300 MW, the opening degrees of the air door of the perimeter air were respectively adjusted from 40% to 25% and 60%, to carry out the adjustment test of the opening degree of the perimeter air, and the test results are shown in FIGS. 5a and 5b. From the results of the adjustment test of the perimeter air,

TABLE 3

Summary of pulverized coal fineness of coal mills after adjustment

| Coal mills | Units | Mill A | | Mill B | | Mill C | |
|---|---|---|---|---|---|---|---|
| Feeding coal amount | t/h | 23/23 | | 21/21 | | 25/25 | |
| Pulverized coal pipe | — | #1/#3 side | #2/#4 side | #1/#3 side | #2/#4 side | #1/#3 side | #2/#4 side |
| Opening degree of damper of folding door | — | 1.0 | 2.0 | 1.5 | 2.5 | 2 | 3 |
| Pulverized coal | % | 23.0 | 22.6 | 25.8 | 24.9 | 21.0 | 19.6 |

| Coal mills | Units | Mill D | | Mill E | | Mill F | |
|---|---|---|---|---|---|---|---|
| Feeding coal amount | t/h | 22/22 | | 21/21 | | 19/19 | |
| Pulverized coal pipe | — | #1/#3 side | #2/#4 side | #1/#3 side | #2/#4 side | #1/#3 side | #2/#4 side |
| Opening degree of damper of folding door | — | 2.5 | 2.5 | 2.0 | 1.5 | 1.7 | 1.7 |
| Pulverized coal | % | 24.6 | 25.2 | 23.3 | 24.1 | 21.3 | 20.9 |

S4, Carrying out a single-factor adjustment test of boiler-related parameters.

The boiler-related parameters of the single-factor adjustment test in step S4 mainly comprises the air distribution mode, the opening degree of perimeter air, the primary air velocity, the operation oxygen content, and the coal sulfur content; the single-factor adjustment test can measure the water wall reducing atmosphere, the boiler thermal efficiency, and the $NO_x$ concentration at the denitration inlet according to the adjustment of the boiler-related parameters, and carry out statistics of the boiler steam temperature and wall temperature.

Figure 3A:
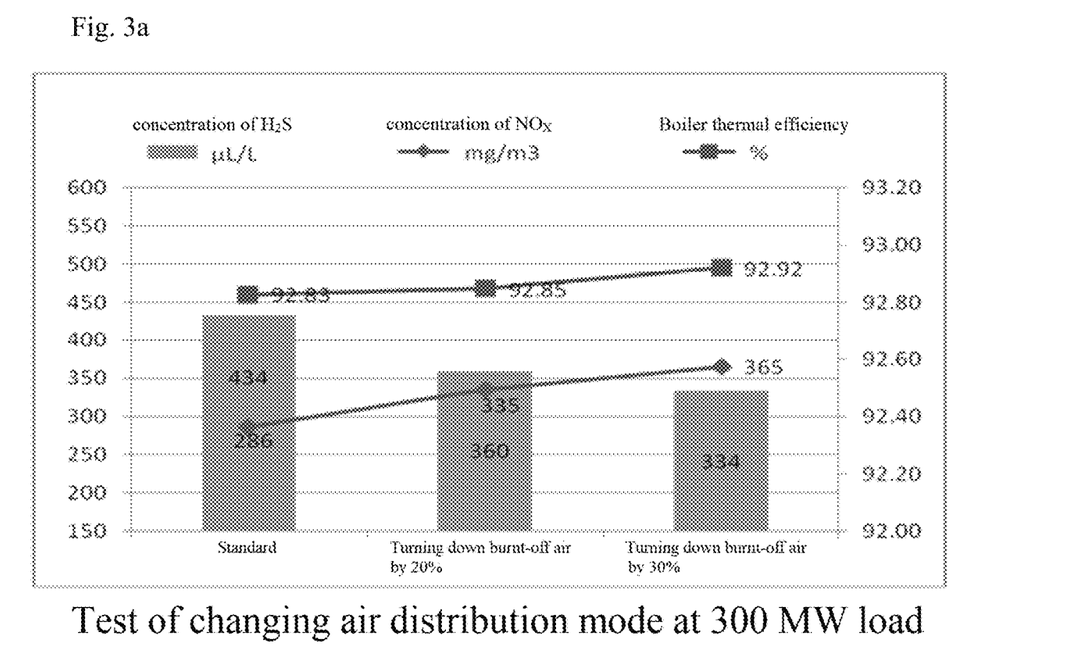
FIG. 3a is the experimental result of adjusting the air distribution mode in this embodiment.
Figure 3B:
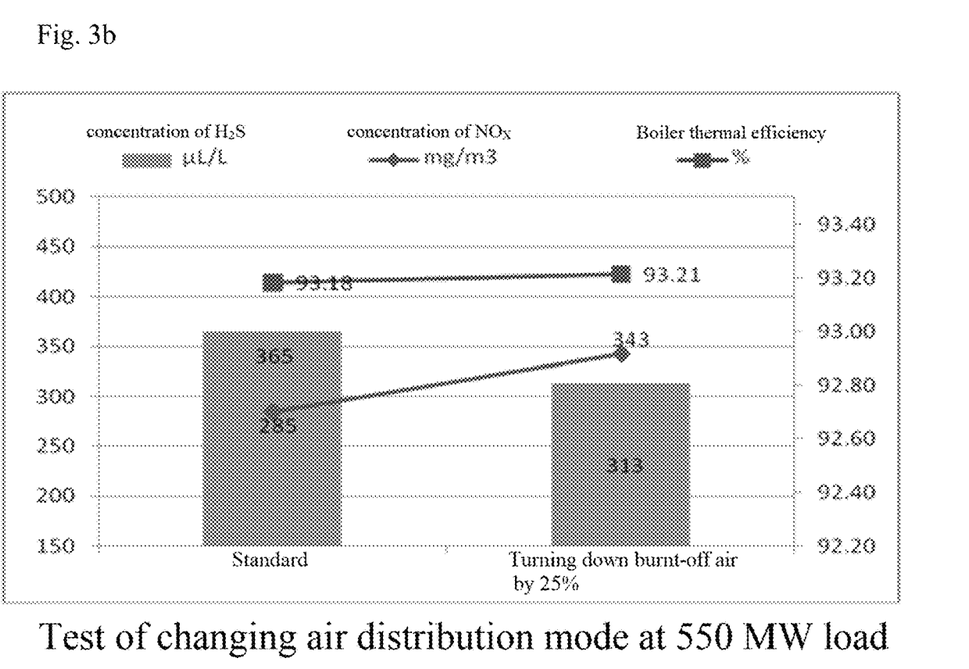
FIG. 3b is the experimental result of adjusting the air distribution mode in this embodiment.

1) Adjustment Test of the Air Distribution Mode:

The air distribution adjustment test was carried out under the load of 550 MW and 300 MW, and the test results of the water wall reducing atmosphere in the area between the burners and the burnt-off air, the $NO_x$ concentration (6% $O_2$) at the denitration inlet and the boiler thermal efficiency under different air distribution modes are shown in FIGS. 3a and 3b. It can be seen from the test results that as the proportion of burnt-off air decreases, the $H_2S$ content of the water wall in the area between the burners and the burnt-off it can be seen that, although decreasing of the opening degree of the air door of the perimeter air will reduce the $NO_x$ content at the denitration inlet, the combustible content in fly ash will increase, the boiler thermal efficiency will decrease, and at the same time, the $H_2S$ content on the water wall reducing atmosphere will increase. Therefore, during daily operation, the opening degree of the perimeter air should be controlled within the range of 40% to 60%.

Figure 6:
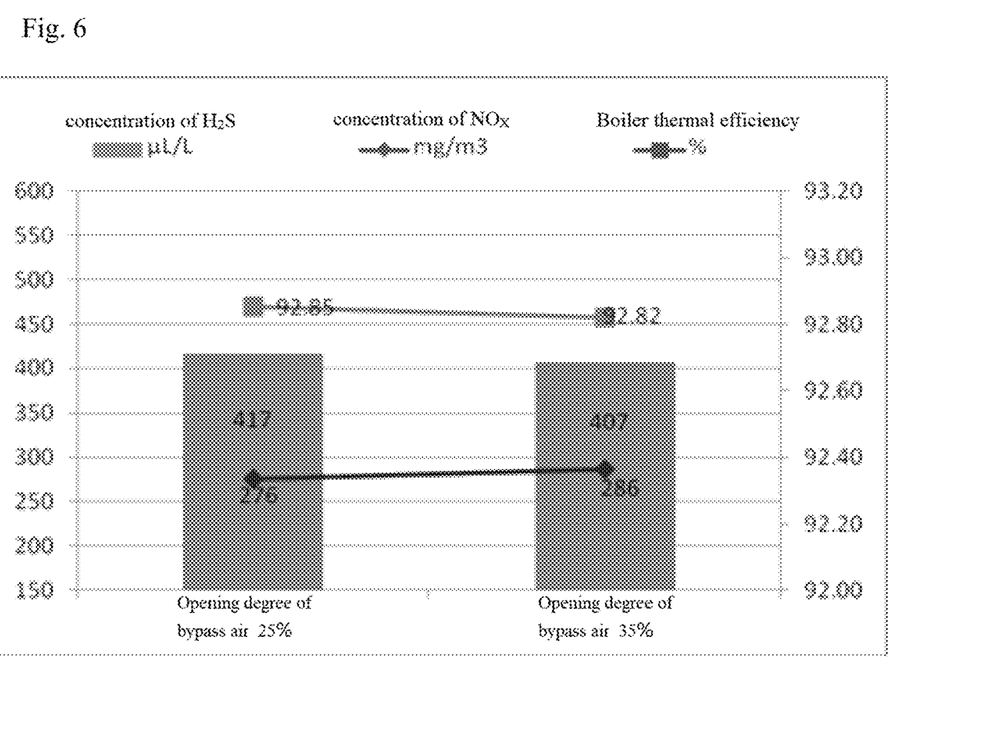
FIG. 6 is the experimental result of adjusting the opening degree of the bypass air in this embodiment.

4) Adjustment Test of the Primary Air Velocity:

Under the conditions of 300 MW load, the same air distribution mode, and the same operation oxygen content, the opening degree of the bypass air of the four coal mills in operation was opened from 25% to 35%, and the primary air velocity of the pulverized coal pipe was increased from about 24 m/s to 27.5 m/s. The test results of the water wall reducing atmosphere in the area between the burners and the burnt-off air, the $NO_x$ concentration (6% $O_2$) at the denitration inlet and the boiler thermal efficiency under different opening degrees of the bypass air are shown in FIG. 6. It can be seen from the test results that the opening degree of the bypass air and the primary air velocity of the pulverized coal pipe have little effect on indicators such as the boiler thermal efficiency, the $NO_x$ content at the denitration inlet, and the H₂S content on the water wall. According to the test results of the bypass air, the opening degree of the bypass air remains in the current control state.

Figure 7:
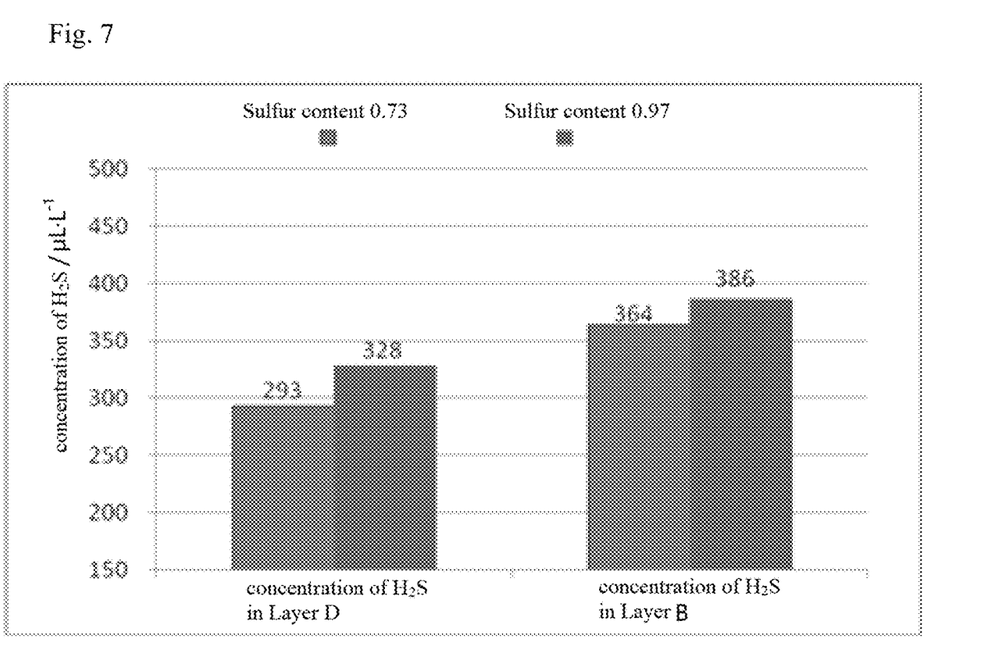
FIG. 7 is the experimental result of changing the coal type in this embodiment.

5) Test of Changing the Coal Type (Sulfur Content in Coal):

According to the actual coal combustion situation of the power plant, two coal types with sulfur content of 0.73% and 0.97% were selected to test the concentration of reducing gas on the water wall area of the furnace, so as to compare the influence of the change of sulfur content in the coal quality on the reducing atmosphere. The results are shown in FIG. 7. It can be seen from the test results that with the increase of the sulfur content in the coal, the H₂S content in the flue gas near the water wall of the furnace shows an overall upward trend, and the amount of slag in the furnace increases, and the temperature of the buffer slag hopper increases. Therefore, from the consideration of alleviating the high-temperature corrosion and dropping coke of the water wall in the furnace, low-sulfur coal with a sulfur content of 0.73% is used in daily operation. S5, Determining the influence levels of the different parameters on the water wall reducing atmosphere, the boiler thermal efficiency, the $NO_x$ concentration at the denitration inlet, and the steam temperature and wall temperature of the boiler, to determine the priorities of the respective relevant parameters in the optimization process.

From the test results of step S4, it can be seen that, although decreasing of the opening degree of the air door of the perimeter air will reduce the $NO_x$ content at the denitration inlet, the combustible content in fly ash will increase, the boiler thermal efficiency will decrease, and at the same time, the H₂S content on the water wall reducing atmosphere will increase. The opening degree of the bypass air and the primary air velocity of the pulverized coal pipe have little effect on indicators such as the boiler thermal efficiency, the $NO_x$ content at the denitration inlet, and the H₂S content on the water wall.

In order to reduce the H₂S content in the flue gas near the water wall, methods such as increasing the operation oxygen content and reducing the proportion of burnt-off air can be adopted, but the above methods will lead to an increase in the $NO_x$ concentration at the denitration inlet. Turning down the air door of the burnt-off air will reduce the H₂S content in the flue gas near the water wall, but increase the $NO_x$ concentration at the denitration inlet, and has little effect on the power consumption of the fan and the boiler thermal efficiency. Compared with increasing the operation oxygen content, turning down the air door of the burnt-off air will also increase the $NO_x$ concentration at the denitration inlet, but it has little effect on the boiler economic efficiency, therefore, the adjustment of air distribution mode is chosen as a measure to slow down the high-temperature corrosion of the water wall.

S6, Carrying out an optimization test of ammonia spraying of the denitration system.

Under the load of the unit ranged from 300 MW to 570 MW, according to the $NO_x$ concentration distribution at a reactor outlet, the manual valve opening of each branch pipe of the AIG ammonia spraying grid was optimized and adjusted for multiple rounds. After the optimization and adjustment of ammonia spraying, the $NO_x$ concentration distribution at the SCR outlet maintains a good uniformity under different unit loads, and the local ammonia spraying amount matches the $NO_x$ concentration distribution. Wherein, under the unit load of 570 MW, when the $NO_x$ concentrations at the SCR inlet and outlet are about 318 mg/m³ and 36 mg/m³, respectively, the relative standard deviation CV values of the $NO_x$ concentration distribution at the reactor outlet of A and B sides are 13% and 15%, respectively, and the average ammonia escape concentrations were 1.7 μL/L and 2.4 μL/L, respectively.

S7, carrying out the maximum safe denitration efficiency test to determine the maximum inlet $NO_x$ concentration value that the denitration system can withstand.

On basis of step S6, the maximum safe denitration efficiency test was carried out. Under the current high load of the unit, the potential P of the SCR denitration reactor is about 2.79, and under the condition that the ammonia escape concentration is 3 μL/L, the maximum safe denitration efficiency is about 89.0%, and under the condition that the ammonia escape does not exceed standard, if the $NO_x$ concentration at the denitration outlet is controlled to be 40 mg/m³, the maximum $NO_x$ concentration at the denitration inlet that the denitration system inlet can withstand is about 366 mg/m³.

S8, Finding the best balance point among the safety, economy, and environmental protection indicators such as the boiler water wall reducing atmosphere, the boiler thermal efficiency, and the $NO_x$ concentration at the denitration inlet, and determining the optimized operation mode of the boiler.

According to the test results of step S5, in order to reduce the H₂S content in the flue gas near the water wall, it will inevitably cause an increase in the $NO_x$ concentration at the denitration inlet. The increase in the $NO_x$ concentration at the denitration inlet will cause problems such as an increase in the amount of ammonia spraying, an increase in ammonia escape, and an increase in the risk of ammonium bisulfate blockage in downstream equipment. According to the test results of the denitration system, if the $NO_x$ concentration at the denitration inlet does not exceed 366 mg/m³, and the ammonia escape at the denitration outlet basically does not exceed the specified standard of 3 μL/L, the risk of ammonium bisulfate blockage in downstream equipment is relatively low. Then, the increased cost of increasing the $NO_x$ concentration at the denitration inlet to control the water wall reducing atmosphere is mainly the cost of increasing the amount of ammonia spraying.

Through the estimation, it can be seen that, if the control value of $NO_x$ concentration at the denitration inlet increases by 50 mg/m³, and the annual increase of liquid ammonia cost is about 650,000 yuan, and the calculation results are shown in Table 4.

TABLE 4

Estimation of the effect of the increase in $NO_x$ concentration at the denitration inlet on the annual liquid ammonia cost

| Item name | Units | Current control value of $NO_x$ at the denitration inlet | $NO_x$ concentration at the denitration inlet increased by 50 mg/m³ |
| --- | --- | --- | --- |
| Unit load | MW | 570 | 570 |
| Total flue gas amount | m³/h | 1930481 | 1931530 |

TABLE 4-continued

Estimation of the effect of the increase in $NO_x$ concentration
at the denitration inlet on the annual liquid ammonia cost

| Item name | Units | Current control value of $NO_x$ at the denitration inlet | $NO_x$ concentration at the denitration inlet increased by 50 mg/m³ |
|---|---|---|---|
| $NO_x$ emission concentration at the denitration inlet | mg/m³ | 290 | 340 |
| Ammonia consumption | kg/h | 182 | 218 |
| Annual utilization hours of the unit | h | 5200 | 5200 |
| Annual ammonia consumption | t/year | 949 | 1135 |
| Liquid ammonia price | Yuan/t | 3500 | 3500 |
| Annual liquid ammonia consumption cost | Ten thousand yuan | 332 | 397 |
| Annual increase in liquid ammonia consumption cost | Ten thousand yuan | — | 65 |

Considering the high-temperature corrosion of the water wall, the increased cost of liquid ammonia and the possible impact on other equipment, it is recommended to increase the current control value of $NO_x$ concentration at the denitration inlet by 50 mg/m³, that is, from 270 mg/m³~300 mg/m³ to 320 mg/m³~350 mg/m³.

After determining the balance point of the $NO_x$ concentration at the denitration inlet, the final optimized operation mode such as the air distribution mode, the operation oxygen content could be determined, so that the best balance point among the safety, economy, and environmental protection indicators such as the boiler water wall reducing atmosphere, the boiler thermal efficiency, and the $NO_x$ concentration at the denitration inlet, and the optimized operation mode of the boiler are obtained.

The results of optimized operating conditions under different loads are shown in Table 5, wherein:

1) Under the load of 570 MW–300 MW, through adjustment, the $H_2S$ content of the reducing atmosphere near the water wall in the area between the burners and the burnt-off air (the B-layer soot blower layer) can be reduced by about 50 μL/L~123 μL/L, with a decrease of about 14% to 28%. The reducing atmosphere near the water wall is significantly reduced, which greatly alleviates the problem of high-temperature corrosion of the water wall and reduces the risk of pipe explosion in the boiler;

2) After adjustment, there is no significant change in boiler thermal efficiency under different loads.

3) After adjustment, the control value of $NO_x$ concentration at the denitration inlet increases by 50 mg/m³, and the annual increase of liquid ammonia cost is about 650,000 yuan.

4) After adjustment, the pipe wall temperature of the finishing-superheater is reduced by 4° C. 6° C., reducing the risk of overheating of the heating surface pipe wall.

Through the integrated comprehensive adjustment method, a reasonable balance point of taking into account the safety, economy and environmental protection of the boiler is found, and the optimized operation mode suitable for the operation of the boiler is obtained. The optimized air distribution mode and content control function for operation oxygen are shown in Table 6 and Table 7.

TABLE 5

Summary of the results of optimized operating conditions under different loads

| Operating condition | | | T-01 | T-72 | T-59 | T-64 | T-47 | T-58 |
|---|---|---|---|---|---|---|---|---|
| Operating condition description | | | 570 MW load diagnostic | 550 MW load optimized | 450 MW load diagnostic | 450 MW load optimized | 300 MW load diagnostic | 300 MW load optimized |
| Load | | MW | 570.0 | 550.0 | 450.0 | 450.0 | 300.0 | 300.0 |
| Mill operation mode | | — | ABCDEF | ABCDEF | ABCDEF | ABCDEF | BCEF | BCEF |
| Operation oxygen content on dashboard | | % | 2.60 | 2.90 | 3.80 | 4.20 | 5.00 | 5.10 |
| Total amount of | | t/h | 279 | 270 | 224 | 218 | 164 | 160 |
| Ambient temperature | | ° C. | 3 | −3 | 2 | −4 | −9 | 2 |
| $NO_x$ concentration at the denitration inlet | | mg/m³ | 272 | 343 | 295 | 350 | 286 | 349 |
| Opening degree of air door | UD | % | 70 | 60 | 100 | 70 | 80 | 60 |
| | UC | % | 10 | 0 | 0 | 0 | 10 | 0 |
| | UB | % | 70 | 50 | 80 | 50 | 60 | 30 |
| | UA | % | 70 | 50 | 80 | 50 | 60 | 30 |
| | FF | % | 45 | 20/40/40/6 | 20/40/40/6 | 25/40/40/4 | 40 | 40 |
| | F | % | 45 | 20/40/40/6 | 20/40/40/6 | 25/40/40/4 | 40 | 60 |
| | EF | % | 45 | 20/40/40/6 | 20/40/40/6 | 25/40/40/4 | 40 | 40 |
| | E | % | 45 | 45 | 45 | 40 | 40 | 60 |
| | DE | % | 45 | 45 | 45 | 40 | 40 | 40 |
| | D | % | 45 | 45 | 45 | 40 | 30 | 30 |
| | DD | % | 45 | 45 | 50 | 40 | 40 | 40 |
| | CC | % | 45 | 45 | 50 | 40 | 40 | 40 |
| | C | % | 60 | 60 | 50 | 40 | 40 | 60 |
| | BC | % | 60 | 60 | 50 | 45 | 40 | 45 |
| | B | % | 60 | 60 | 50 | 45 | 40 | 60 |
| | AB | % | 65 | 65 | 55 | 45 | 40 | 45 |

TABLE 5-continued

Summary of the results of optimized operating conditions under different loads

| Operating condition | | | | T-01 | T-72 | T-59 | T-64 | T-47 | T-58 |
|---|---|---|---|---|---|---|---|---|---|
| | A | | % | 65 | 65 | 55 | 45 | 20 | 20 |
| | AA | | % | 65 | 65 | 55 | 45 | 20 | 20 |
| Air fan current | Primary air fan current | | A | 181.0 | 177.0 | 171.0 | 161.0 | 145.0 | 147.0 |
| | Forced draft fan current | | A | 93.0 | 90.0 | 80.0 | 79.0 | 73.0 | 71.0 |
| | Induced draft fan current | | A | 441.0 | 422.0 | 361.0 | 358.0 | 294.0 | 294.0 |
| | Total fan | | A | 715.0 | 689.0 | 612.0 | 598.0 | 512.0 | 512.0 |
| Measured data | Combustible matter in fly ash | | % | 0.97 | 0.85 | 0.51 | 0.41 | 0.58 | 0.63 |
| | Combustible matter in boiler slag | | % | 0.51 | 0.49 | 0.21 | 0.22 | 0.67 | 0.25 |
| | Operation oxygen content | | % | 2.87 | 3.05 | 4.03 | 4.43 | 5.55 | 5.40 |
| | $NO_x$ (6% $O_2$) | | mg/m$^3$ | 288 | 370 | 313 | 375 | 302 | 368 |
| | CO content | | μL/L | 5 | 4 | 8 | 3 | 4 | 3 |
| Boiler thermal efficiency | Measured boiler thermal efficiency | | % | 93.08 | 92.85 | 92.85 | 92.97 | 92.60 | 92.59 |
| | Corrected exhaust gas temperature | | °C. | 144.2 | 142.3 | 139.1 | 136.7 | 131.9 | 134.2 |
| | Corrected heat loss due to exhaust gas | | % | 5.91 | 5.86 | 6.04 | 6.03 | 6.22 | 6.28 |
| | Heat loss due to unburned carbon | | % | 0.50 | 0.23 | 0.23 | 0.20 | 0.29 | 0.29 |
| | Corrected boiler efficiency | | % | 93.09 | 93.21 | 93.18 | 93.21 | 92.83 | 92.77 |
| Wall temperature and steam temperature | Flue gas temperature deviation between two sides of furnace outlet | SH finishing inlet | °C. | 55 | 50 | 79 | 35 | 69 | 45 |
| | | RH finishing inlet | °C. | 7 | 10 | 17 | 50 | 76 | 76 |
| | | RH finishing outlet | °C. | 66 | 73 | 72 | 53 | 15 | 5 |
| | Maximum wall temperature | | °C. | 596.2 | 590 | 589.2 | 585.3 | 591.2 | 579.6 |
| | Maximum wall temperature | | °C. | 604.1 | 598.9 | 600.6 | 598.2 | 604.2 | 596.5 |
| | Maximum wall temperature | | °C. | 531.6 | 525.7 | 539.3 | 531.8 | 531.8 | 527.7 |
| | Maximum wall | | °C. | 415.6 | 419.7 | 406.1 | 404.3 | 386.7 | 378.8 |
| | Main steam | | °C. | 571.2/567.8 | 569.4/566.6 | 569.1/567.0 | 572.1/567.3 | 571.9/568.1 | 571.7/567.5 |
| | Reheat | | °C. | 565.3/564.4 | 566.8/563.7 | 565.8/562.7 | 566.7/564.6 | 565.9/570.1 | 564.7/563.5 |
| | Main steam temperature deviation on | | °C. | 3.4 | 2.8 | 2.1 | 4.8 | 3.8 | 4.2 |
| | Reheat steam temperature | | °C. | 0.9 | 3.1 | 3.1 | 2.1 | 4.2 | 1.2 |

TABLE 5-continued

Summary of the results of optimized operating conditions under different loads

| Operating condition | | | T-01 | T-72 | T-59 | T-64 | T-47 | T-58 |
|---|---|---|---|---|---|---|---|---|
| Flue gas composition near the water wall | $O_2$ at D-layer soot blower layer | % | 0.9 | 1.5 | 2.3 | 2.8 | 3.0 | 3.9 |
| | CO at D-layer soot blower layer | μL/L | 13992 | 6542 | 2809 | 2293 | 7032 | 686 |
| | $H_2S$ at D-layer soot blower layer | μL/L | 293 | 246 | 243 | 228 | 302 | 194 |
| | $O_2$ at B-layer soot blower layer | % | 0.4 | 0.4 | 0.5 | 0.7 | 1.8 | 2.1 |
| | CO at B-layer soot blower layer | μL/L | 69060 | 41656 | 55626 | 24760 | 23659 | 13041 |
| | $H_2S$ at B-layer soot blower layer | μL/L | 364 | 313 | 370 | 316 | 434 | 311 |

TABLE 6

Recommended air distribution mode under different loads

| Air doors | Units | 600 MW | 450 MW | 300 MW |
|---|---|---|---|---|
| UD layer | % | 60 | 60 | 60 |
| UC layer | % | 0 | 0 | 0 |
| UB layer | % | 50 | 40 | 30 |
| UA layer | % | 50 | 40 | 30 |
| FF layer | % | 40 | 40 | 40 |
| F layer | % | 40 | 40 | 40 |
| EF layer | % | 40 | 40 | 40 |
| E layer | % | 40 | 40 | 40 |
| DE layer | % | 40 | 40 | 40 |
| D layer | % | 50 | 50 | 30 |
| DD layer | % | 50 | 50 | 40 |
| CC layer | % | 50 | 50 | 50 |
| C layer | % | 60 | 50 | 50 |
| BC layer | % | 60 | 50 | 50 |
| B layer | % | 60 | 50 | 50 |
| AB layer | % | 60 | 55 | 50 |
| A layer | % | 60 | 55 | 10 |
| AA layer | % | 60 | 55 | 10 |

TABLE 7

Optimized boiler operation oxygen content control value

| Current control value | Load command, MW | 300 | 350 | 400 | 450 | 500 | 550 | 600 |
|---|---|---|---|---|---|---|---|---|
| | Operation oxygen content, % | 4.80 | 4.47 | 4.13 | 3.80 | 3.37 | 2.93 | 2.50 |
| Recommended control value | Load command, MW | 300 | 350 | 400 | 450 | 500 | 550 | 600 |
| | Operation oxygen content, % | 4.8 | 4.47 | 4.13 | 4.00 | 3.57 | 3.13 | 2.70 |

Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. An adjustment method for operation of a pulverized coal boiler, the method comprising:
   S1, mounting a sampling pipe on a water-cooled wall of a boiler during a period of stopping operation of the boiler, wherein the sampling pipe is configured to obtain reducing atmosphere of installation location thereof;
   S2, operating the boiler at a first load point, a second load point, and a third load point, respectively, to obtain test data, wherein a value of the first load point is smaller than a value of the second load point, and a value of the second load point is smaller than the value of the third load point; and
   wherein the test data comprises the reducing atmosphere at the sampling pipe, a concentration of $NO_x$ at a denitrification inlet of the boiler, and a boiler thermal efficiency;
   S3, controlling air velocity deviation between pulverized coal pipes of a coal mill of the boiler to be less than or equal to a first preset threshold value, and controlling pulverized quantity deviation between two pulverized coal pipes on one side of the coal mill to be less than or equal to a second preset threshold value; and controlling fineness of pulverized coal of the coal mill to be within a preset range;
   S4, carrying out a single-factor test, wherein single-factor variables thereof are air distribution mode, opening degree of perimeter air, primary air velocity, operation oxygen content, and sulfur content in coal; the single-factor test comprising the following steps:
   S4-1, keeping the opening degree of perimeter air, the primary air velocity, the operation oxygen content, and the sulfur content in coal unchanged, adjusting the air distribution mode, and testing the reducing atmosphere at the sampling pipe, the boiler thermal efficiency, and the concentration of $NO_x$ at the denitrification inlet, respectively;

S4-2, keeping the air distribution mode, the primary air velocity, the operation oxygen content, and the sulfur content in coal unchanged, adjusting the opening degree of perimeter air, and testing the reducing atmosphere at the sampling pipe, the boiler thermal efficiency, and the concentration of $NO_x$ at the denitrification inlet, respectively;

S4-3, keeping the air distribution mode, the opening degree of perimeter air, the operation oxygen content, and the sulfur content in coal unchanged, adjusting the primary air velocity, and testing the reducing atmosphere at the sampling pipe, the boiler thermal efficiency, and the concentration of $NO_x$ at the denitrification inlet, respectively;

S4-4, keeping the air distribution mode, the opening degree of perimeter air, the primary air velocity, and the sulfur content in coal unchanged, adjusting the operation oxygen content, and testing the reducing atmosphere at the sampling pipe, the boiler thermal efficiency, and the concentration of $NO_x$ at the denitrification inlet, respectively;

S4-5, keeping the air distribution mode, the opening degree of perimeter air, the primary air velocity, and the operation oxygen content unchanged, adjusting the sulfur content in coal, and testing the reducing atmosphere at the sampling pipe, the boiler thermal efficiency, and the concentration of $NO_x$ at the denitrification inlet, respectively;

S5, comparing influence levels of each single-factor variable on the reducing atmosphere at the sampling pipe, boiler thermal efficiency, and concentration of $NO_x$ at the denitrification inlet according to test results of steps S41 to S45;

S6, operating the boiler at the first load point, the second load point, and the third load point, respectively, and adjusting ammonia flows of branch pipes of each ammonia spraying grid according to $NO_x$ concentration distribution at an outlet cross-section of an SCR reactor of the boiler, to cause an ammonia spraying amount of each branch pipe of ammonia spraying grid to match the $NO_x$ concentration distribution;

S7, operating the boiler at the third load point and determining a maximum concentration value of $NO_x$ at the denitrification inlet that a denitrification system of the boiler can withstand without ammonia escape exceeding a third preset threshold; and S8, determining a reducing atmosphere at the sampling pipe and a boiler thermal efficiency according to the maximum concentration value of $NO_x$ at the denitrification inlet that the denitrification system can withstand, and determining a boiler optimized operation mode according to a comparison result in step S5, comprising: a single-factor variable with greater influence in the comparison result were prioritized for adjustment.

2. The adjustment method for operation of a pulverized coal boiler according to claim 1, in step S1, during the period of stopping operation of the boiler, an inspection is carried out to determine an area where corrosion occurs in the water-cooled wall of the boiler; and the installation location and number of the sampling pipes to be installed are determined according to the area where corrosion occurs.

3. The adjustment method for operation of a pulverized coal boiler according to claim 2, the sampling pipes extend through the water-cooled wall of the boiler and are flush with an inner surface of the water-cooled wall.

4. The adjustment method for operation of a pulverized coal boiler according to claim 1, in step S2, the test data further comprises steam temperature of the boiler and wall temperature.

5. The adjustment method for operation of a pulverized coal boiler according to claim 4, in the single-factor test of step S4, vapor temperature of the boiler and wall temperature are also tested;

in step S5, influence levels of each single-factor variable on the reducing atmosphere at the sampling pipe, boiler thermal efficiency, and concentration of $NO_x$ at the denitrification inlet, vapor temperature of the boiler, and wall temperature are compared.

6. The adjustment method for operation of a pulverized coal boiler according to claim 1, in step S3, the control of the air velocity deviation between pulverized coal pipes of the coal mill and the control of the pulverized quantity deviation between two pulverized coal pipes on one side of the coal mill is carried out firstly, and then the control of the fineness of the pulverized coal of the coal mill is carried out.

7. The adjustment method for operation of a pulverized coal boiler according to claim 6, in step S3, the air velocity deviation between pulverized coal pipes of the coal mill is controlled within 5% and the pulverized quantity deviation between two pulverized coal pipes on one side of the coal mill is controlled within 5% by adjusting an adjustable shrinkage holes of the coal mill and a pulverized coal distributor.

8. The adjustment method for operation of a pulverized coal boiler according to claim 6, in step S3, the fineness of the pulverized coal of the coal mill is controlled within a range from 20% to 25.5% by means of a folding door baffle of the boiler.

* * * * *